United States Patent [19]
Beamish et al.

[11] Patent Number: 5,385,386
[45] Date of Patent: Jan. 31, 1995

[54] TRANSPORTABLE SEAT

[76] Inventors: Claudia H. Beamish; Michael A. L. Derrington, both of Westraw House, Pettinain Lanark ML11 8SL, Scotland

[21] Appl. No.: 129,164

[22] PCT Filed: Apr. 7, 1992

[86] PCT No.: PCT/GB92/00622
§ 371 Date: Oct. 6, 1993
§ 102(e) Date: Oct. 6, 1993

[87] PCT Pub. No.: WO92/17361
PCT Pub. Date: Oct. 15, 1992

[30] Foreign Application Priority Data

Apr. 8, 1991 [GB] United Kingdom ............... 9107313

[51] Int. Cl.⁶ .............................................. B60N 2/28
[52] U.S. Cl. .................... 297/256.16; 297/130
[58] Field of Search ............... 297/250.1, 118, 130, 297/216.1, 217, 254, 256.16; 280/30

[56] References Cited
U.S. PATENT DOCUMENTS

| 3,116,069 | 12/1963 | Dostal | 297/254 X |
|---|---|---|---|
| 3,690,525 | 9/1972 | Koons | 297/254 X |
| 3,829,113 | 8/1974 | Epelbaum | 297/254 X |
| 3,922,035 | 11/1975 | Wener | 297/253 X |
| 4,186,961 | 2/1980 | Farrell, Jr. et al. | 297/256.16 X |
| 4,750,783 | 6/1988 | Irby et al. | 297/256.16 |
| 4,915,446 | 4/1990 | Darling et al. | 297/256.16 X |

FOREIGN PATENT DOCUMENTS

| 4111010 | 1/1992 | Germany | 297/256.16 |
|---|---|---|---|
| 1546772 | 5/1979 | United Kingdom . | |
| 2099294 | 12/1982 | United Kingdom . | |
| 2166691 | 5/1986 | United Kingdom . | |
| 2211082 | 6/1989 | United Kingdom . | |

Primary Examiner—Peter R. Brown
Assistant Examiner—Milton Nelson, Jr.
Attorney, Agent, or Firm—McAulay Fisher Nissen Goldberg & Kiel

[57] ABSTRACT

A transportable seat which can be coupled either to a car frame or a buggy frame, and may also be locked selectively onto the car frame, the car frame being of the type that can be anchored to a car by a harness or conventional safety belt.

20 Claims, 7 Drawing Sheets

TRANSPORTABLE SEAT

BACKGROUND OF THE INVENTION

1. Field of the Invention

The present invention relates to transportable seats for transporting children.

2. Description of the Prior Art

Pushchairs and buggies are known for transporting children for walking distances, and car safety seats are known for transporting children in motor cars. Often, a journey made by a child carer or parent and a child includes a walk and a journey by car, and therefore a buggy seat and a car safety seat are needed for such journies, since to meet the requirements of the safety standards set by the authorities it is simply not possible to leave the child in the buggy seat whilst in the car, and a special car safety seat has to be employed.

It is difficult however for carers to transfer children from known buggy seats to known car safety seats and from car safety seats to buggy seats. For example, the harness which holds a child in a buggy first has to be undone before transfer, and after transfer to the car, the safety seat harness to hold the child in the safety seat has to be done up again. Also, a child which has fallen asleep in its buggy or by the motion or sound or the car invariably wakes up when lifted up out of its seat, causing stress to both the carer and child.

Known buggies on the market may either have a collapsible seat and buggy frame or a more comfortable moulded bucket seat. In the former case the seat has the disadvantage of lacking comfort, and in the latter case the seat itself cannot be collapsed and therefore takes up a great deal of space when stored.

A search has revealed a number of published patents in which the concept of a seat which can be moved between a frame attached to the car seat and a buggy frame is suggested. These are GB 2116837A, GB 2197784A, GB 2208109A, GB 2211082A, GB 1546772, U.S. Pat. No. 4,768,795 and EP 164909A2. None of these however address the question of how the seat can be safely and securely attached to the car seat frame and to the buggy frame whilst also being readily releasable therefrom. This is the problem with which the present invention is concerned.

SUMMARY OF THE INVENTION

According to a first aspect of the present invention there is provided a kit for transporting a child, the kit comprising a seat, preferably a rigid moulded seat, the seat being adapted to couple to and uncouple from a car frame, the car frame being adapted to be anchored to a car by a harness or seat belt.

In a preferred form of the invention a kit for transporting a child, the kit comprising a seat, preferably a rigid moulded seat, and a car frame, the seat being adapted to couple to and uncouple from the car frame, the car frame being adapted to be anchored to a car by a harness or a seat belt is characterised in that the coupling and uncoupling of the seat to the car frame is by upper and lower coupling means which are operable from a single location on the car seat frame or on the seat.

It is preferred that the buggy frame and car frame are compatible in that they are arranged to couple to and uncouple from the same points on the seat. In effect this permits that there can be only one set of coupling means on the seat, coupling with arrangements on the car frame and buggy frame which are alike.

The means coupling the seat to each of the car and buggy frames may incorporate a generally straight bar on one or other of either the seat or car seat frame and buggy frame.

Preferably, upper and lower coupling means are arranged to effect the coupling between the seat and the car and buggy frames. In this case, when the seat is being coupled to either the car frame or the buggy frame, it is preferred that the upper coupling means should couple before the lower coupling means. It is preferred that each of the upper and lower coupling means are attached to or integral with the seat, and that each couples to a bar on the car and buggy frames.

It is also preferred that the upper coupling means includes a hook and the lower coupling means includes a latch.

Locking means may be provided on one or both of the seat and car frame, the locking means preferably being adapted to simultaneously lock the upper and lower coupling means of the seat and the car frame. Thus the arrangement is desirably such that the seat whilst coupled to the car frame can be removably locked in place.

It is preferred that the locking means should be capable of simultaneously locking and unlocking all means coupling the seat and car frame. If there are upper and lower coupling means as mentioned above then this is especially appropriate. The ability to lock and unlock simultaneously has obvious advantages in convenience, but also for example in a situation where the car has been involved in a motor accident and it is necessary to have the child quickly removed from the car. This particular feature may allow a child to be removed from a car much more quickly than from a conventional car safety seat where the child would have to be removed from its harness before exiting the car. In this respect it is also preferred that the car seat frame is adapted to be releasably anchored by the harness or seat belt to the car so that it is possible, if necessary, to remove the chair and frame from the car quickly as one unit.

Preferably, the locking means is unitary with or provided on the car frame. The locking means may in this case comprise an upper coupling means lock which is coupled by a connector rod or rods to a lower coupling means lock, with the connector rod or rods being slideably received within one or more bars or members of the car frame.

When the car frame is in position in the car, the locking means may slide up to and down from a raised position to respectively unlock and lock the upper and lower coupling means. In the down position, the upper locking means lock may abut against and therefore hold in locked position the hook of the upper coupling means, and the lower locking means lock may abut against and hold a part of the lower coupling means to lock the same.

The locking means may have a locking latch, preferably being integral with the upper locking means, to releasably lock the locking means in the down position.

Biasing means, for example a spring, may be provided to bias or raise the locking means conveniently to the raised position. It is preferred that the biasing means should be positioned at least partially within one or more members of the car frame. When connector rods are provided it is desirable for the biasing means to act upon a portion of one or more of the connector rods.

The biassing means may serve as a safety feature since, if the locking means is in a position in which it is not fully engaged, the biassing means may facilitate an indication that the locking means is not locked. The indication may be visible merely by a raised nature of the locking means and could additionally or alternatively be transmitted by means of a light or alarm buzzer, or by revealing some coloured member alerting the user to the unlocked condition of the system.

The seat may incorporate lifting handles to facilitate transfer to and from the car and buggy frames.

The term buggy should be understood as including all vehicles intended to carry a child and be pushed along.

It is of course desirable that the locking means and indeed the whole of the seat and car frame should be made strong enough to be considered safe in the event of a car crash.

In another embodiment of the present invention, the means coupling the seat to the car frame may unitarily incorporate locking means to the extent that it is considered strong enough to be considered safe in the event of a car crash.

In a preferred modification of the present invention, the car frame may be provided with reclinement means which permit the seat to be orientated in the car in either a sitting up erect position or a reclined lying down position. In the erect position, the seat is preferably configured facing forwards on a forwards facing seat in the car, and in the reclined position, the seat is preferably orientated facing backwards on a forwards facing seat in the car. The reclinement means may incorporate a member attached to the car frame being movable, preferably pivotal, between first and second positions to alter the configuration of members adapted to support the car frame from a car seat bottom.

It will be recalled that in the broadest aspect of the present invention there is provided a kit for transporting a child, the kit comprising a seat being arranged to couple to and uncouple from a car frame, the car frame being arranged to be anchored to a car by a harness or a seat belt.

In this aspect of the invention, it may be possible for a carer who does not require a buggy to place the child in the seat at home or elsewhere outside the car, and to place the child and seat in the car at the same time. This may be easier in some cases than loading a child into a car safety seat which is fixed in a car.

There are many other applications to which the invention may extend. Indeed many modes of transport might benefit from the invention- for example it is envisaged that the invention might have applications in all other forms of land travel, as well as maritime and air travel.

It is preferred that the child carried by the seat of the present invention should weigh less than 25 kg or so, although the invention could extend to larger persons, and may well have application in the transport of disabled persons of all sizes.

BRIEF DESCRIPTION OF THE DRAWINGS

The present invention may be carried out in various ways and one example of a kit of a seat, car frame and buggy frame embodying the invention will now be described with reference to the accompanying drawings, in which.

DESCRIPTION OF THE PREFERRED EMBODIMENTS

Figure 1:
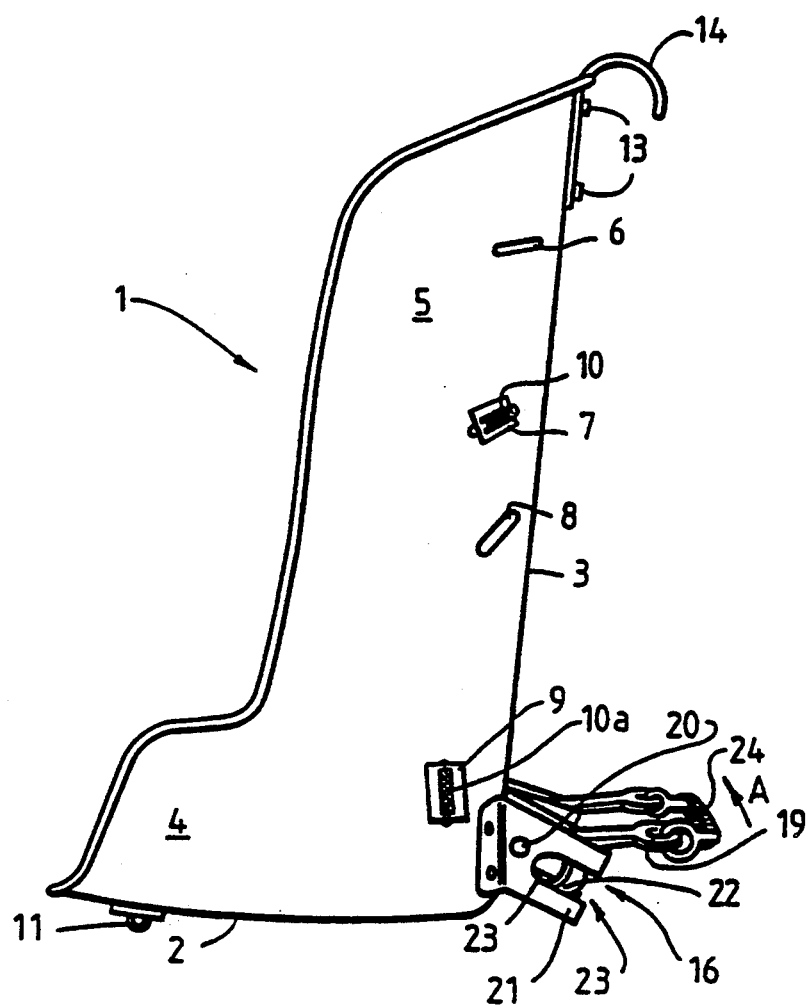
FIG. 1 is a left side view of a seat in accordance with the present invention.

A seat 1 embodying the present invention is suitably proportioned to receive a child (not shown) from infant baby up to 25 kg or so in size.

The seat has a generally flat bottom portion 2 orientated approximately perpendicular to a generally flat back portion 3. Each side of the bottom portion is bordered by a side wall 4 arranged to confine laterally, at least to a certain extent, the thighs or legs of the child. Each side of the back portion is bordered by a side wing 5 arranged to confine laterally the torso, and possibly to a certain extent, the head of the child.

The back portion 3, bottom portion 2, side walls 4 and side wings 5 are moulded in a unitary structure from a strong, lightweight plastics material. The unitary structure of the seat 1 therefore resembles a small bucket seat. The seat is thus relatively rigid.

The seat 1 has a padded, removable cover (not shown) which is attachable to pad and give comfort to the interior of the bucket of the seat. The seat cover has apertures which when in place align with top shoulder apertures 6, middle shoulder apertures 7, bottom shoulder apertures 8 and lap apertures 9 in the seat 1.

Dependent upon the torso length of the child a pair of shoulder straps (not shown) can be arranged to pass through the most suitable pair of shoulder apertures 6, 7, 8. The length of the straps protruding through the apertures 6, 7, 8 into the bucket of the seat may be pre-set by adjusters 10.

In addition to the shoulder straps, a pair of lap straps (not shown) can be arranged to pass through the lap apertures 9. The lap straps are similar to, and have adjusters 10a similar to, the adjusters 10 applied to the shoulder straps.

Centrally in the bottom portion 2 of the seat at differing distances from the back portion 3 there are two crutch apertures (not shown) in the seat, the most suitable of which can be selected to allow for the provision of a central crutch strap (not shown). There are two further apertures in the seat cover which align with these crutch apertures. The crutch strap has an adjuster 11 similar to those used on the shoulder and lap straps.

The two shoulder straps, two lap straps and crutch strap can be joined or buckled together to form a five point harness.

An upper coupling means 12 is attached to an upper part of the seat 1 by bolts 13. The upper coupling means has two hooks 14 spaced apart by a gap 15.

Figure 2:
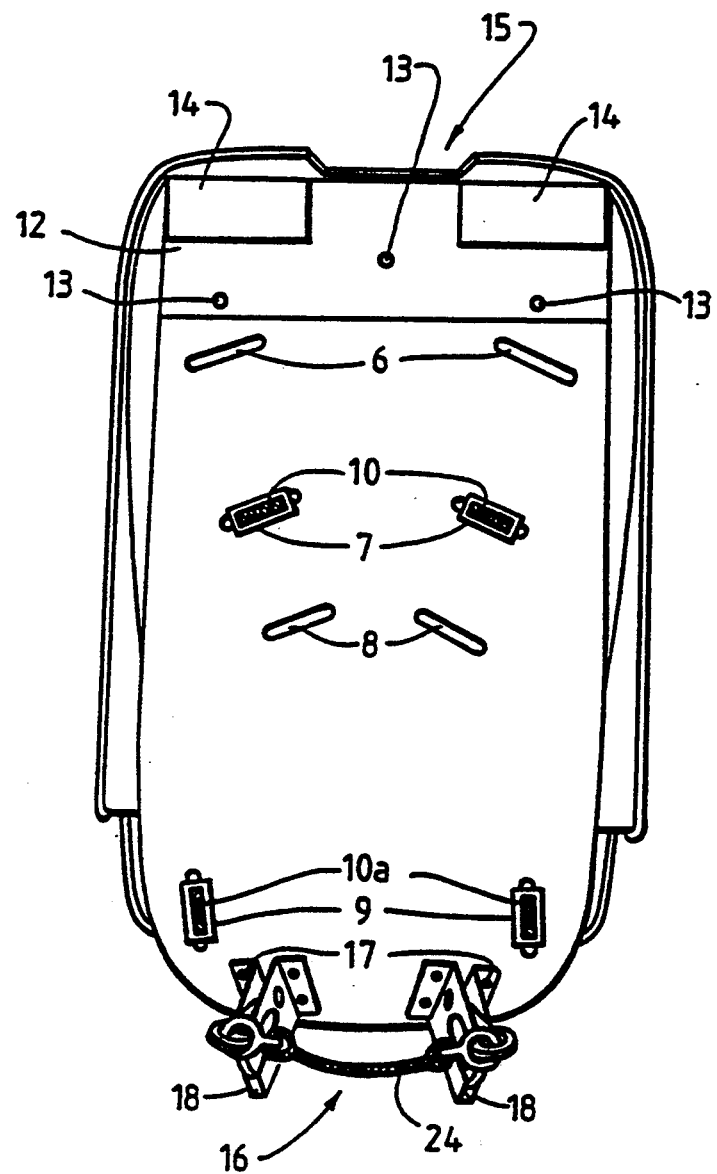
FIG. 2 is a rear view of the seat of FIG. 1.
Figure 3:
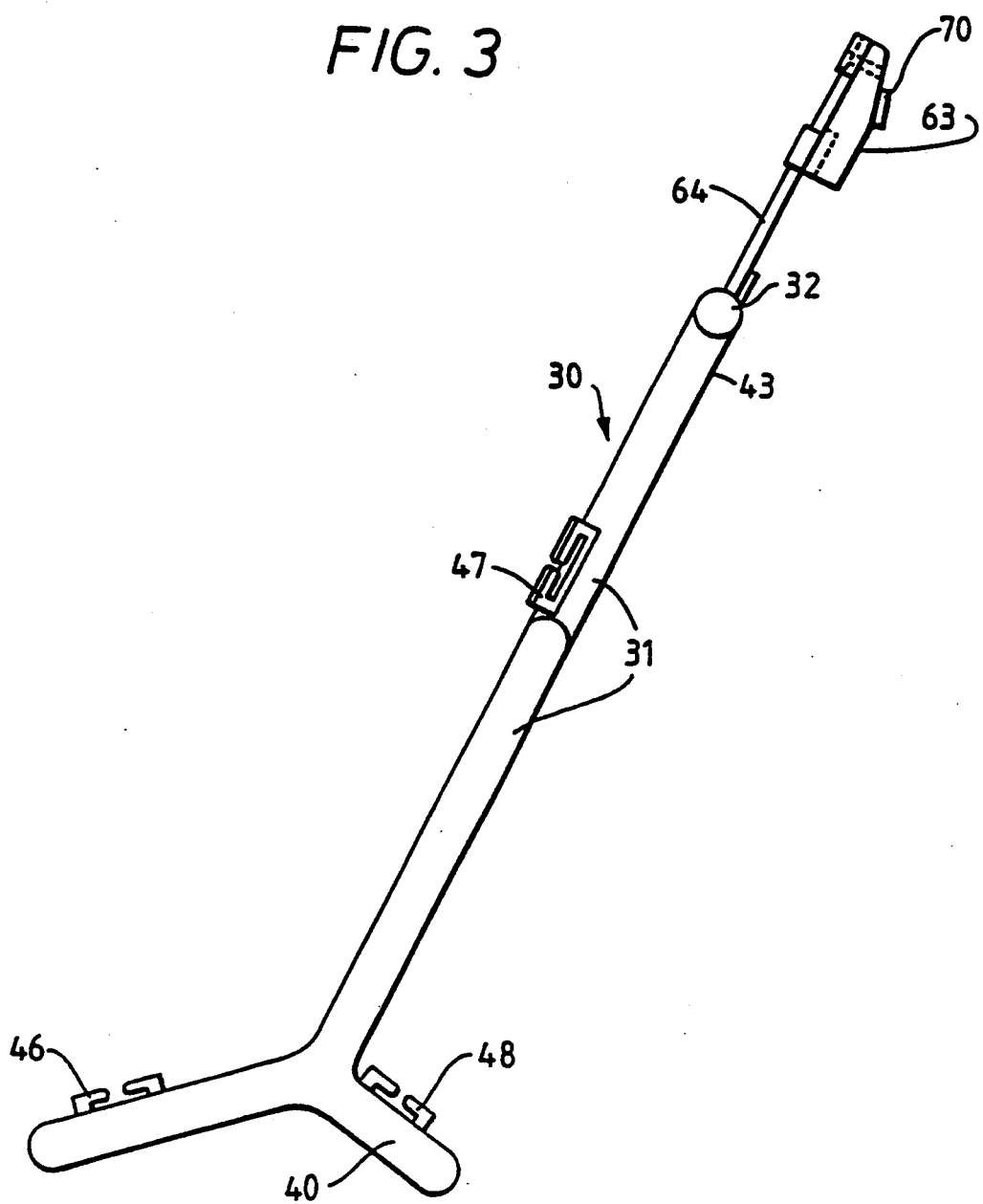
FIG. 3 is a left side view of a car frame, compatible with the seat of FIGS. 1 and 2.

Lower coupling means 16 is attached to a lower part of the seat by bolts 17. The lower coupling means 16 has two latches 18. Each latch 18 has a lever 19 which is rotatable about a pin 20 mounted to a body portion 21 of the latch. The lever 19 is integrally formed with a tooth 22 which, as shown in FIGS. 1 and 2 closes an elongated slot 23 in the body portion 21, and which can be rotated in the direction A of FIG. 1 to open the elongated slot. The two latches are interconnected by a leash 24, so that when the leash is pulled upwards both elongated slots 23 are opened.

A car frame 30 to which the seat 1 is arranged to be coupled has two side members 31 which are rigidly interconnected by a plurality of generally straight and parallel cross members, including an upper member 32, a middle member 33, a lower member 34, a rear member 35 and a front member 36. The rear member 35 has end parts 40 generally perpendicular to the cross members in order to space the main part 41 of the rear member downwards and backwards from the side members 31.

Figure 5:
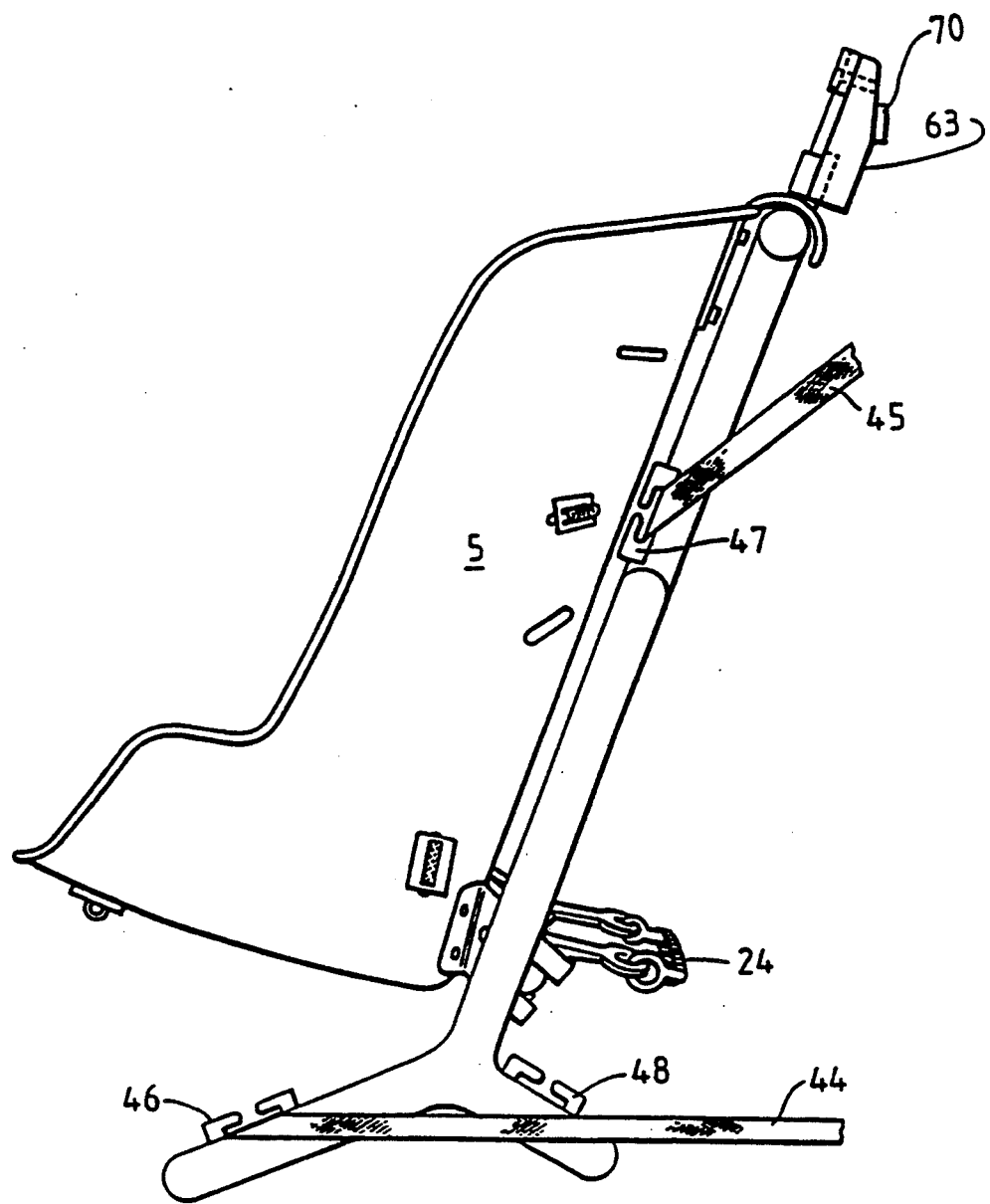
FIG. 5 is a left side view of the seat of FIGS. 1 and 2 when locked to the car frame of FIGS. 3 and 4, the car frame being retained by a conventional shoulder and lap strap car seat belt.
Figure 6:
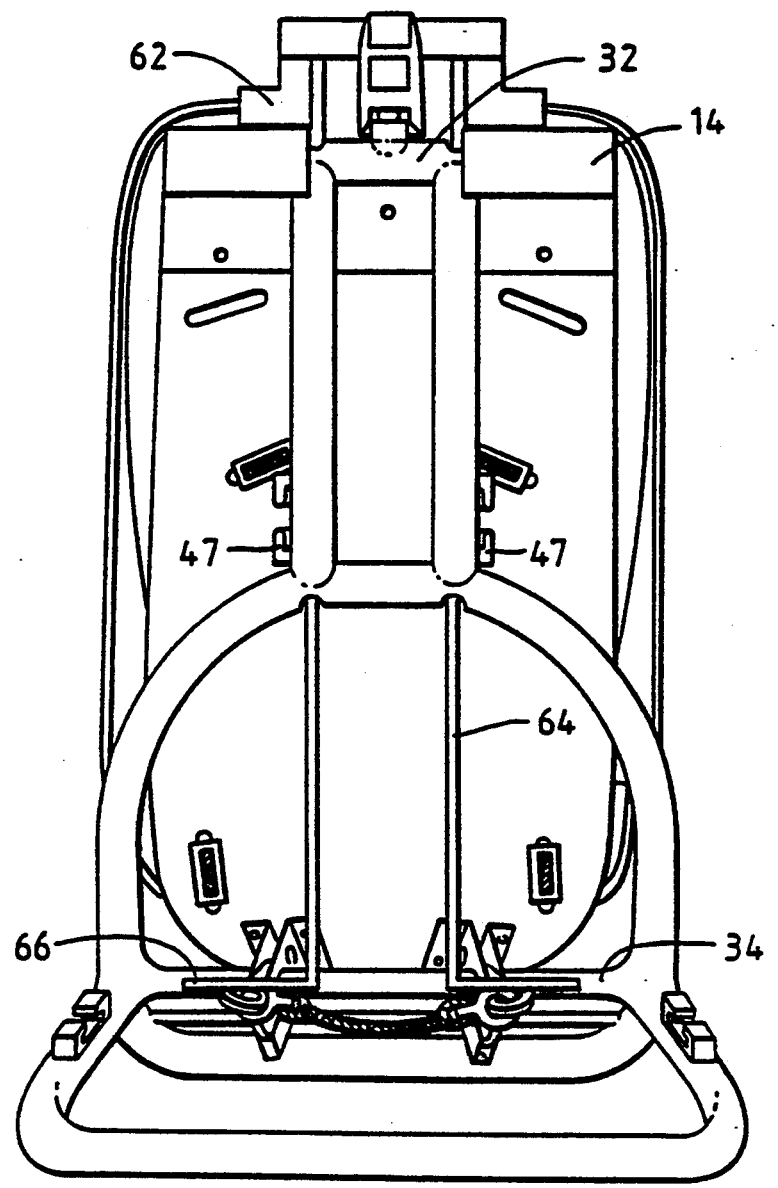
FIG. 6 is a rear view of the apparatus of FIG. 5.

The car frame 30 can be positioned facing forwards on the forwards facing seat (not shown) of a car (not shown), with the front 36 and rear 35 members supported on the car seat bottom and an upper portion 43 of each side member resting on the car seat back. It is possible with the car frame 30 thus positioned for a conventional lap 44 and diagonal shoulder 45 strap seat belt of the car (see FIG. 5) to be threaded through two lap securement 46 and one shoulder securement 47 means. There are in fact two shoulder securement means 47, one on each side member 31, and the most suitable one of these is selected depending upon the handedness of the seat belt.

Alternatively, the car frame can be positioned facing rearwards on a forwards facing seat (not shown) of a car, being supported on the car seat bottom by the front member 36 and the rear member 35. In this rearwards facing position, dependent upon the particular orientation of the members of the car frame 30 and the angle of the surface of the car seat bottom, the car frame 30 may take up a less or more reclined attitude with respect to the car or gravity than the forwards facing position.

In the rearwards facing position, the conventional lap and diagonal shoulder strap may be threaded through alternate lap securement means 48 and one of the shoulder securement means 47.

Alternatively, the lap securement means 46 may be more preferable than the alternate lap securement means 48, and likewise in the forwards facing position the alternate lap securement means 48 may be more preferable than the lap securement means 46. It will be realised that the car frame 30 could be anchored to a seat which faces otherwise than forwards in a car with the car frame being configurable in directions analogous to the forwards and rearwards facing positions already discussed.

Figure 7:
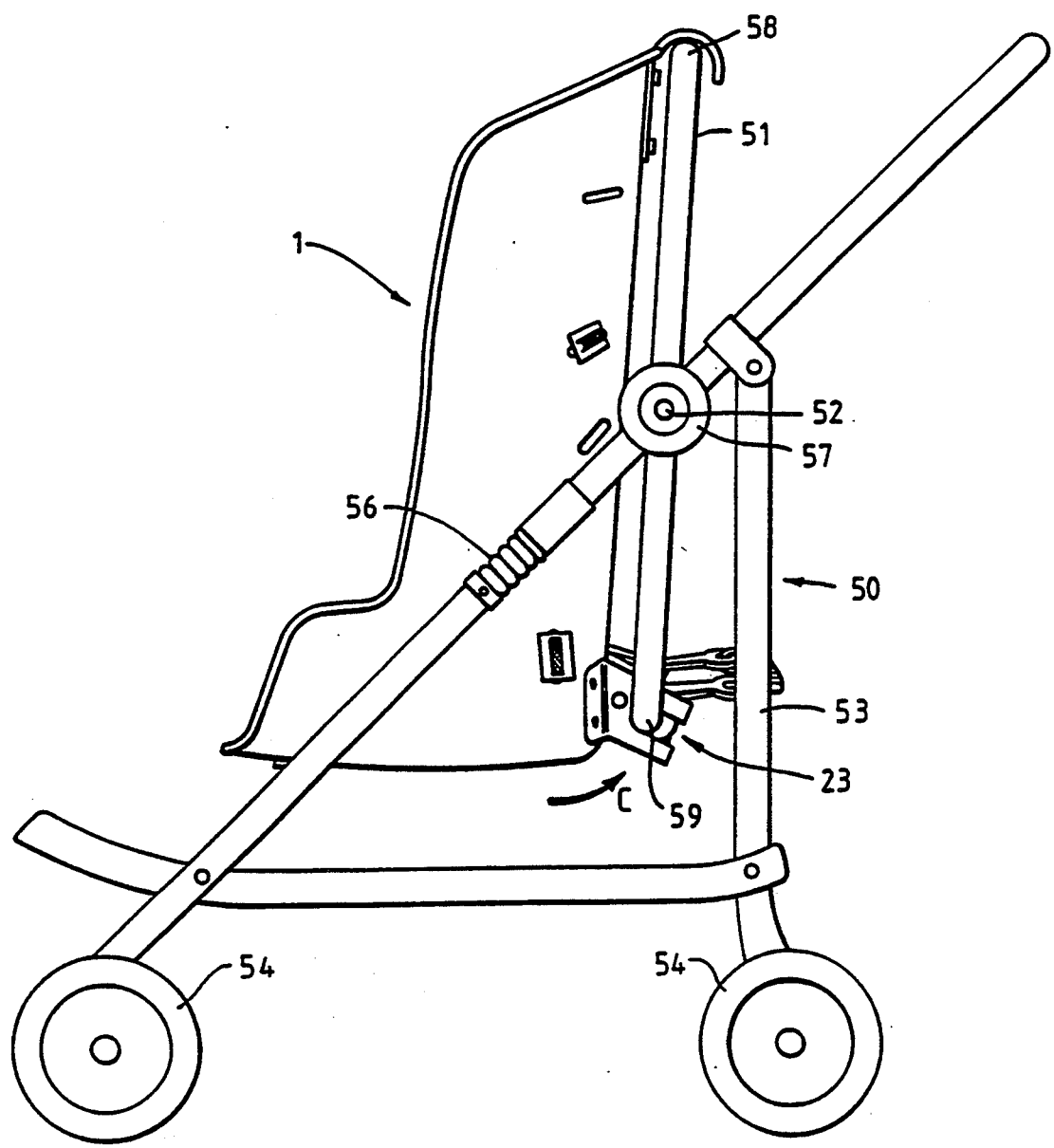
FIG. 7 is a left side view of the seat of FIGS. 1 and 2 when attached to a compatible buggy frame.

In FIG. 7 the seat 1 is shown coupled to a generally conventional buggy frame 50. The buggy frame 50 comprises a coupling frame 51 which is pivotally supported at a pivot 52 by a support frame 53. The pivot is lockable by a rotation lock 57 at a plurality of indexable rotational positions. In turn, the support frame 53 is supported from the ground by buggy wheels 54. The structure of the support frame 53 includes a plurality of pivot points and can be locked into a seat supporting orientation at a pivot lock 56. With the pivot lock 56 and the rotation lock 57 unlocked and the seat 1 removed from the buggy frame 50, it is possible to collapse the buggy frame 50 to a storage orientation in which the coupling frame 51 and bars of the support frame 53 lie in a flat or generally planar configuration.

The coupling frame 51 has a top bar 58 and a bottom bar 59 which are generally parallel and spaced apart generally by the same distance as the distance between the upper coupling means 12 and lower coupling means 16 of the seat 1.

In order to attach the seat 1 to the buggy frame 50, the buggy frame is first set up in the seat supporting configuration. Thereafter the hooks 14 of the upper coupling means 12 are hooked over the top bar 58 of the buggy frame 50. Once this has been done the bottom portion 2 of the seat 1 can be pushed or alternatively allowed to fall automatically under gravity in the direction C of FIG. 7, so that the bottom bar 59 of the buggy frame 50 enters the elongated slots 23 of the latches 18 of the lower coupling means 16 to take up the fully coupled position of FIG. 7.

In order to decouple the seat 1 from the buggy frame 50, the leash 24 is pulled upwards in the direction A of FIG. 1 so that the teeth 22 of the latches 18 open the elongated slot 23. The bottom portion 2 of the seat 1 is then rotated forwards in the direction opposed to direction C of FIG. 7, and the seat 1 can then be lifted from the buggy frame 50.

The seat 1 can be coupled to and decoupled from the car frame 30 much in the same way as it can be coupled to and decoupled from the buggy frame 50. When attached to the car frame 30, the upper cross member 32 of the car frame 30 couples with the upper coupling means 12 of the seat 1 and the lower cross member 34 couples with the lower coupling means 16 of the seat 1. The operative distance between the upper 32 and lower 34 cross members of the car frame 30 is therefore comparable with operative distance between the top 58 and bottom 59 bars of the buggy frame 50.

Locking means 60 (see FIG. 4) is provided on the car frame for locking the upper 12 and lower 16 coupling means of the seat 1 once the seat is in the coupled position. The locking means 60 includes an upper lock 61. The upper lock 61 has a locking latch 63 orientated between a pair of abutments 62. A pair of connector rods 64 extend downwards from the upper lock 61 passing slideably through apertures in the top member 32, along an interior passage of the upper portion 43 of each side member 32 and through apertures in the middle members 33 of the car frame 30, terminating in 'L' portions of a lower lock 66. The top cross member 32 has a central dog latch 67 which is arranged to operatively pass into and lock to the locking latch 63 of the upper lock 61.

Figure 4:
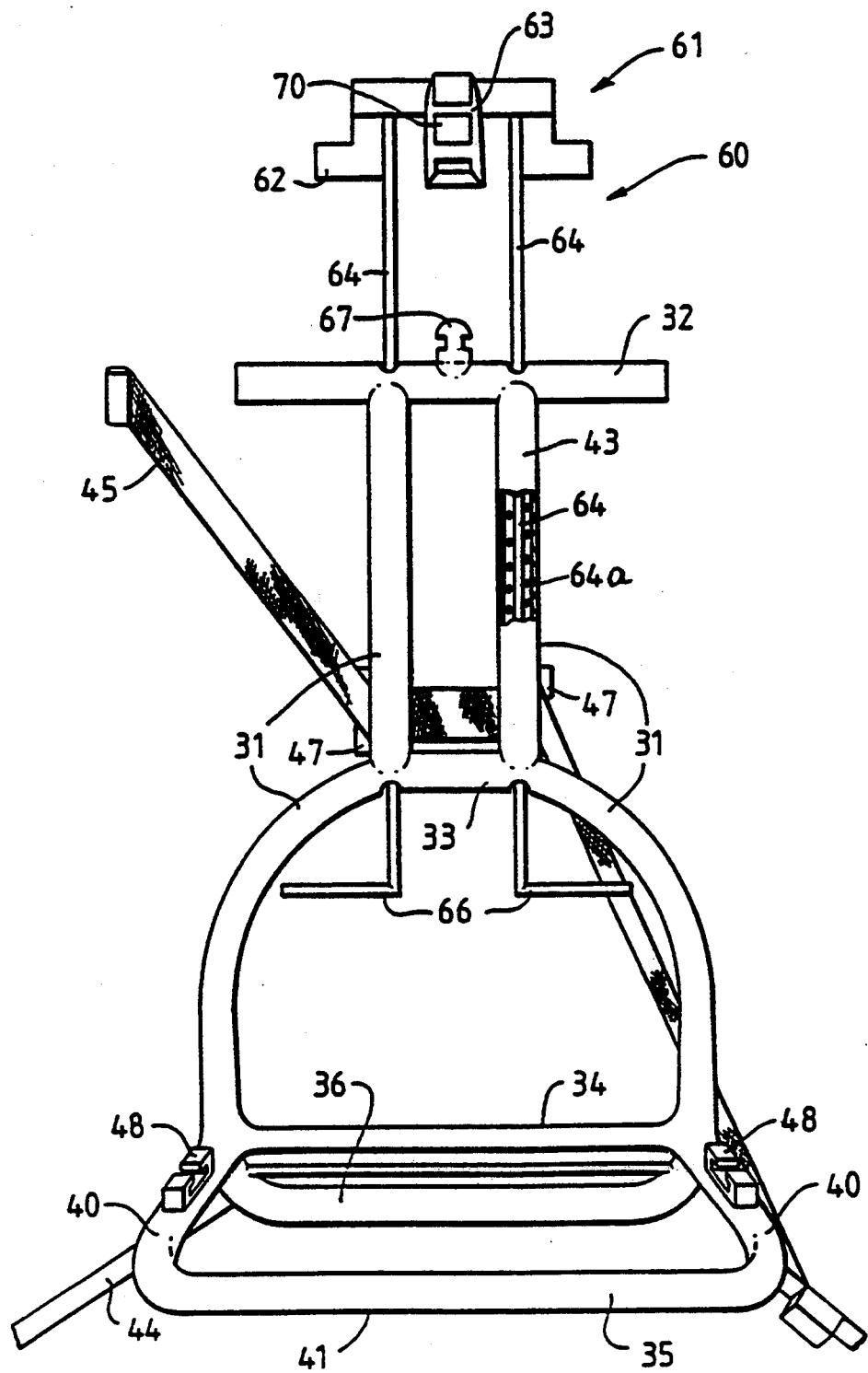
FIG. 4 is a rear view of the car frame of FIG. 3 when retained by a conventional shoulder and lap strap car seat belt.

In order to lock the seat 1 to the car frame 30 the locking means 60 is first raised up to a raised position as shown in FIG. 4. Alternatively, the locking means 60 may be biassed and raised to the raised position by spring means (64a), which is preferably at least partially positioned within the upper portion 43 of one or both side members 31, so that when the seat 1 and car frame 30 are uncoupled, the locking means is conveniently kept in the raised position. Such biassing also serves as a safety feature since if the locking means 60 were not in a fully locked condition, the locking means 60 would be biassed and automatically raised to provide a clear indication of such condition. Once the seat is coupled to the car frame 30 (as described above), the locking means is then moved downwards until the locking latch 63 engages the dog latch 67 to achieve a fully locked condition. In this position, the abutments 62 abut against the hooks 14 of the upper coupling means 12 of the seat to resist any upward motion of the upper coupling means 12, with the side members 31 of the car frame 30 preventing any lateral motion of the upper coupling means 12. Additionally, the 'L' portions of the lower lock 66 engage with the levers 19 of the lower coupling means 16 of the seat 1 to hold the lower coupling means locked.

In order to unlock the seat, a button 70 of the locking latch 63 can be depressed to unlock the dog latch 67 so that the locking means can be raised, again to the upward position. It is then possible to uncouple the seat 1 from the car frame 30 as already described above.

The seat and car frame, when coupled and locked by the locking means 60 should be constructed to be capable of enduring car crashes to at least the standards set by the authorities. In particular the five point harness holding the child in the seat 1, the locking means 60, the upper 12 and lower 16 coupling means of the seat 1, and the car frame 30 should all be made strong enough to ensure adequate safety of the child in the event of a car crash.

When a child carer (not shown) transports the child on a journey involving a buggy push and a car trip, the child is harnessed into the seat at home, and transferred into and out of the car as necessary whilst still harnessed into the seat, thereby avoiding the stress and inconvenience to the carer and disruption to the child, who for example may be asleep, which is associated with transfer to and from a conventional buggy car seat and car safety seat.

The invention also extends to the transport of a plurality of children. For example a buggy for carrying more than one child, of the side by side or one behind the other type, could be envisaged with a transferable seat similar to that described above. Although the arrangement of the multiple seat could be unitary, it is preferred that only one child should be transferred at a time to limit the weight the carer has to lift. The multiple seat arrangement may therefore include a separately transferable seat for each child.

We claim:

1. A kit for transporting a child, said kit comprising:
   a car seat having a frame, said seat being adapted to couple to and uncouple from said frame;
   said car seat frame being adapted to be mounted to a car;
   upper and lower coupling means for coupling and uncoupling said car seat to said car seat frame, said upper and lower coupling means being operable from a single location associated with said seat; and
   locking means adapted to simultaneously lock said upper and lower coupling means when said seat is coupled to said car seat frame;
   said locking means comprising an upper lock and a lower lock connected to said car seat frame, said upper and lower locks being operatively coupled together by a connector rod.

2. The kit as claimed in claim 1, wherein said upper and lower coupling means are operable from said car seat frame.

3. The kit as claimed in claim 1, wherein said car seat is a rigid moulded seat.

4. The kit as claimed in claim 1, wherein said car seat frame is mounted to the car by a harness.

5. The kit as claimed in claim 1, wherein said car seat frame is mounted to the car by a seat belt.

6. The kit as claimed in claim 1, wherein said upper coupling means is adapted to couple before the coupling of said lower coupling means, and wherein said upper coupling means is adapted to uncouple after the uncoupling of said lower coupling means.

7. The kit as claimed in claim 1, wherein said locking means is provided integral with said car seat frame.

8. The kit as claimed in claim 1, wherein said car seat frame includes a portion having a passageway therein, said connector rod being slideably received within said passageway upon operation of said locking means.

9. The kit as claimed in claim 1, wherein said locking means is disposed for movement between an unlocked state and a locked state, said locking means when in its unlocked state being readily apparent, and biasing means for biasing said locking means to its unlocked state.

10. The kit as claimed in claim 1, further comprising a buggy frame, said seat adapted to couple to and uncouple from said buggy frame.

11. The kit as claimed in claim 10, wherein said upper and lower coupling means are adapted to couple said seat to each of said car seat frame and said buggy frame.

12. A kit for transporting a child, said kit comprising:
   a seat having a frame, said seat being adapted to couple to and uncouple from said frame;
   said frame being adapted to be mounted to a vehicle;
   upper and lower coupling means for coupling and uncoupling said seat to said frame, said upper and lower coupling means being operable from a single location associated with said seat;
   said upper coupling means being adapted to couple before the coupling of said lower coupling means, and said upper coupling means being adapted to uncouple after the uncoupling of said lower coupling means; and
   locking means integral with said frame adapted to lock said upper and lower coupling means when said seat is coupled to said frame;
   said locking means comprising an upper lock and a lower lock connected to said frame, said upper and lower locks being operatively coupled together by a connector rod.

13. The kit as claimed in claim 12, wherein said frame includes a portion having a passageway therein, said connector rod being slideably received within said passageway upon operation of said locking means.

14. The kit as claimed in claim 12, wherein said locking means is disposed for movement between an unlocked state and a locked state, said locking means when in its unlocked state being readily apparent, and biasing means for biasing said locking means to its unlocked state.

15. A kit for transporting a child, said kit comprising:
   a car seat having a frame, said seat being adapted to couple to and uncouple from said frame;
   said car seat frame being adapted to be mounted to a car;
   upper and lower coupling means for coupling and uncoupling said car seat to said car seat frame, said upper and lower coupling means being operable from a single location associated with said seat;
   locking means adapted to simultaneously lock said upper and lower coupling means when said seat is coupled to said car seat frame;
   said locking means being disposed for movement between an unlocked state and a locked state, said locking means when in its unlocked state being readily apparent; and
   biasing means for biasing said locking means to its unlocked state.

16. The kit as claimed in claim 15, wherein said upper coupling means is adapted to couple before the coupling of said lower coupling means, and wherein said upper coupling means is adapted to uncouple after the uncoupling of said lower coupling means.

17. The kit as claimed in claim 15, wherein said locking means comprises an upper lock and a lower lock connected to said car seat frame, said upper and lower locks being operatively coupled together by a connector rod.

18. The kit as claimed in claim 17, wherein said car seat frame includes a portion having a passageway therein, said connector rod being slideably received within said passageway upon operation of said locking means.

19. A kit transporting a child, said kit comprising:

a seat having a frame, said seat being adapted to couple to and uncouple from said frame;

said frame being adapted to be mounted to a vehicle;

upper and lower coupling means for coupling and uncoupling said seat to said frame, said upper and lower coupling means being operable from a single location associated with said seat;

said upper coupling means being adapted to couple before the coupling of said lower coupling means, and said upper coupling means being adapted to uncouple after the uncoupling of said lower coupling means;

locking means integral with said frame adapted to lock said upper and lower coupling means when said seat is coupled to said frame;

said locking means being disposed for movement between an unlocked state and a locked state, said locking means when in its unlocked state being readily apparent; and biasing means for biasing said locking means to its unlocked state.

20. The kit as claimed in claim 19, wherein said locking means comprises an upper lock and a lower lock connected to said frame, said upper and lower locks being operatively coupled together by a connector rod.

* * * * *